March 12, 1968 H. RUBELMANN 3,373,100
PRECONTROL SALINITY COMFENSATOR FOR AUTOMATIC CATHODIC PROTECTION SYSTEM
Filed May 22, 1964
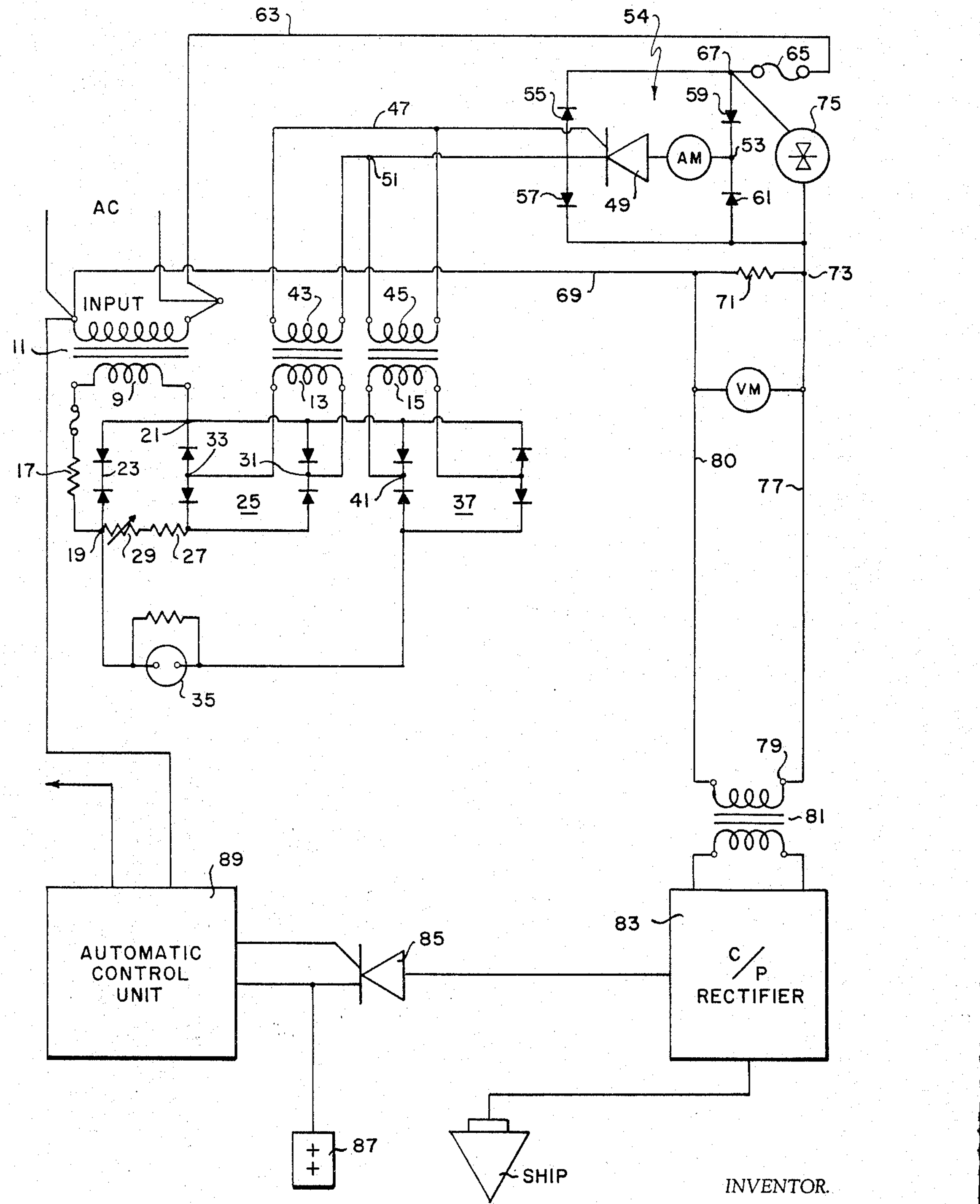
INVENTOR.
HAYDN RUBELMANN
BY [signature] ATTY.
[signature] AGENT United States Patent Office 3,373,100 Patented Mar. 12, 1968

3,373,100

PRECONTROL SALINITY COMPENSATOR FOR AUTOMATIC CATHODIC PROTECTION SYSTEM

Haydn Rubelmann, 1222 Cromwell Ave., Chesapeake, Va. 23320

Filed May 22, 1964, Ser. No. 369,645
8 Claims. (Cl. 204—196)

The invention described herein may be manufactured and used by or for the Government of the United States of America for governmental purposes without the payment of any royalties thereon or therefor.

The present invention relates to a control system for varying alternating currents in proportion to a fluctuating entity, and more particularly, relates to a pre-control salinity compensation for a cathodic protection system wherein alternating current supplied to a ship's cathodic protection rectifier is varied inversely as the local conductivity of sea water.

Automatic control units for controlling cathodic protection currents as a function of the hull condition (e.g. ratio of exposed metal to unexposed metal) and as a function of average water conductivity have already been designed. Such systems are generally adequate except in conditions of radical rapidly occurring changes in local sea water conductivity. An example of such a system may be found in copending application Ser. No. 218,468 filed on Aug. 21, 1962 by the present inventor.

The difficulty of compensating a cathodic protection system for local changes in sea water conductivity (so that, for example, overprotection does not deleteriously effect hull paint) is overcome by the present invention in which novel means are provided to impress, for each half-cycle of supply alternating current, additional current for a duration of time inversely proportional to the local sea water conductivity. More specifically, means are provided for comparing, or differentiating between, local sea water resistance and a reference resistance. The greater the resistance of the local sea water exceeds that of the reference, the earlier in each supply alternating current half-cycle therein produced a gate pulse. This pulse, for each half-cycle, acts as a gating pulse to turn on a silicon controlled rectifier or other suitable threshold device. Bi-directional gating circuits means coupled with the threshold device produces current additive to the supply A.C. for each half-cycle. The combined increased alternating current is then fed to a basic cathodic protection rectifier or other suitable means by which cathodic protection currents are resultantly compensated.

It is, therefore, among the objects of the present invention to provide a novel alternating current control circuit; to provide a novel compensation control circuit for modifying alternating currents in accordance with fluctuating entities; to provide on alternating current compensation control circuit having means whereby responsive to changes in sea water conductivity cathodic protection currents are compensatorily varied, and to provide a novel automatic cathodic protection system having means for compensating for local changes in sea water conductivity.

These and other objects, features and advantages of the present invention will be better understood by reference to the accompanying description and drawings in which:

The single figure is a view of a composite schematic circuit and block diagram of the present invention.

Reference is now made to the single figure which shows the salinity sensing and compensation circuit according to the invention in schematic form, along with other components of a cathodic protection system in block diagram form.

A suitable source of alternating current supply for the system as a whole is coupled via a secondary 9 of an input transformer 11 to the salinity compensation circuit. The compensation circuit has two rectified current paths—a reference path terminating in reference control winding 13 and a salinity sensing path terminating in a signal control winding 15. The signal control winding 15 located adjacent winding 13 and is wound in a sense opposite to that of the winding 13.

The current in both said paths is regulated to a suitable alternating current level by a resistance 17 connected to one end of the secondary 9. The other side of the resistance 17 is connected to a junction point 19.

The other end of the input secondary 9 is connected to a junction point 21. Interconnecting the junction points 19 and 21 are a pair of Zener diodes 23 connected cathode to cathode, which due to their combined characteristics provide regulation of the inputs currents and voltage.

A full-wave bridge rectifier 25 receives one of its inputs from the junction point 21 and the other from the junction point 19 via a reference resistance 27 in series with a reference potentiometer 29. The adjustment of the potentiometer 29 determines the level at which salinity compensation is to take effect. The rectifier 25 has its positive output terminal 31 connected to one end of the reference control winding 13 and its negative output terminal 33 connected to the other end of the winding 13.

A salinity sensing device 35 of any suitable construction and having an internal resistance proportional to the conductivity of water has its input side connected to the junction point 19 and its output side connected as one input to a full wave bridge rectifier 37. The other input to the rectifier 37 is taken from the junction point 21. The respective negative and positive output terminals 39 and 41 of the rectifier 37 are connected to the respective ends of the signal control winding 15.

The algebraic sum of the voltages on the signal control windings 13 and 15 determines the phase angle at which a gate pulse will be produced at a pair of windings 43 and 45 inductively coupled to the windings 13 and 15. The gate pulse windings 43 and 45 are connected in series with respect to a gate input lead 47 for an SCR 49, one end of the windings 43 and 45 being connected to the input electrode of the SCR 49 via a junction point 51, the other ends of the windings 43 and 45 being connected to the input gate of the SCR 49.

The anode of the SCR 49 is connected via a suitable monitoring ammeter to a junction point 53. The respective junction points 51 and 53 form control terminals for a bi-directional diode gate circuit 54 composed of the SCR 49 and the diodes 55, 57, 59 and 61. The A.C. supply current for the bi-directional gate circuit 54 is provided by a lead 63 from one end of the primary of transformer 11 via a safety fuse 65 to a junction point 67, and from the other end of said primary via a lead 69 and a back-biasing resistance 71 to a junction point 73. If desired, a voltage surge suppressor composed of a pair of Zener diodes 75 shunting the gate circuit 54 may be employed.

The junction point 73 is connected via a lead 77 to a suitable point on the primary winding 79 of an output transformer 81. The other end of the primary 79 is connected via a lead 80 to the lead 69 on the other side of resistance 71. The secondary of the transformer 81 is connected to the basic cathodic protection rectifier unit 83.

As described in applicant's said copending application Ser. No. 218,468, the cathodic protection rectifier unit 83 may be connected at its negative side to a ship's hull and at its positive side to a control SCR 85. The current output of the SCR 85 is fed to an anode 87 thereby establishing current flow between said anode and the ship's hull.

Further control of the current flow between the anode 87 and the ship's hull may be provided by an automatic control unit 89 which may be arranged similar to the automatic control unit shown in FIG. 7 of copending application Ser. No. 218,468.

In the precontrol salinity compensation circuit it is desired that the average voltage to the cathodic protection rectifier 83 vary inversely as the water conductivity.

In operation, current from the secondary 9 of the transformer 11 is rectified in rectifier 25 and fed to reference winding 13. The voltage on the winding 13 is maintained at a pre-set reference level by suitable adjustment of the potentiometer 29.

Current from the secondary 9 is also fed to the salinity sensor 35, the output of which is rectified in the rectifier 37 and impressed on the signal control winding 15.

The windings 13 and 15 are coupled with the windings 43 and 45. The algebraic sum of the D.C. voltages on the windings 13 and 15 determines the phase angle that a gate pulse will be produced at windings 43 and 45. The greater the current flowing in the reference winding 13 exceeds that of the signal control winding 15, the earlier in the supply A.C. half cycle there appears a pulse on the gate input lead 47 for the SCR 49. No gate pulses controlling the SCR 49 are produced when the currents flowing in control windings 13 and 15 are equal.

As the effective resistance of the salinity sensor 35 approaches infinity the difference in current flow thru the windings 13 and 15 approaches a maximum. Therefore, an output gate pulse of small phase angle occurs, turning on the SCR 49 for nearly a full half cycle of the input A.C. Thus, the higher the resistance (i.e., the lower the conductivity) of the sea water passing thru the sensor 35, the higher the average voltage output of the SCR 49.

Under a condition of no pulse output from the gate pulse windings 43 and 45, the SCR is turned off, and the additional current passing through the primary winding of the transformer 81 is at a minimum or zero value.

When the SCR 49 is turned on by virtue of an output pulse appearing on the windings 43, 45, the SCR 49 conducts on a portion of one polarity swing of A.C. supply via the diodes 59 and 57, and on a portion of the opposite polarity swing via the diodes 55 and 61, thereby impressing additional currents on the primary winding of the transformer 81. Thus, the time duration of current flow on the transformer 81 is increased inversely with sea water conductivity.

If there is no load on the secondary winding of the transformer 81, the resistance 71 prevents the back EMF from back-biasing the SCR 49.

Obviously many modifications and variations of the present invention are possible in the light of the above teachings. It is therefore to be understood that within the scope of the appended claims the invention may be practiced otherwise than as specifically described.

What is claimed is:

1. A cathodic protection assembly for controlling the amount of alternating current supplied to a cathodic protection load in accordance with the resistance of an electrolyte, comprising:

a source of alternating current;

first and second input windings connected in opposing senses;

first and second current rectifying paths each coupled to said alternating current source and coupled to said first and second input windings respectively;

means in said second path responsive to the resistance of the electrolyte for changing its electrical characteristics in accordance with the resistance of the electrolyte;

bi-directional gating means coupled to said source for receiving supply current therefrom;

a threshold conduction device connected in circuit with said bi-directional gating means;

said threshold conduction device having a signal control element for receiving signals to drive said device to conduction; and first and second signals control windings connected to the signal control element of said threshold device, said windings being located in coupling relation with said first and second input windings to thereby receive by induction the algebraic sum current thereof;

whereby when the current flowing in said first and second input windings is sufficiently unequal, a gating signal pulse is produced in said signal control windings to drive said threshold device to conduction thereby causing current to flow in said bi-directional gating means for a portion of an alternating current cycle according to the resistance of said electrolyte.

2. The assembly according to claim 1 wherein said threshold device comprises a silicon controlled rectifier.

3. The assembly according to claim 1 wherein said bi-directional gating means comprises first and second pairs of diodes connected across said source of alternating current and in series with said threshold device, said bi-directional gating means having an output terminal connected to the cathodic protection load.

4. The assembly according to claim 3 but further characterized by resistance means connected between said source of alternating current and the output terminal of said bi-directional gating means for protecting the threshold device connected in circuit with said bi-directional gating means from being back-biased by the load.

5. Compensation apparatus for a cathodic protection system, said system having a cathodic protection anode and an automatic control unit therefor, a ship as the cathodic object and a cathodic protection rectifier therefor, and circuit means interposed between said ship and the anode for adjusting the current flow between the anode and the ship (electrode), said apparatus comprising:

a source of alternating current supply for said system;

comparison means coupled to said source of alternating current for producing a voltage proportional to the difference between the potential drop across a reference resistance and a resistance variable with local sea water conductivity;

bi-directional gating means having input elements coupled to said source of alternating current and to said comparison means, and having an output element coupled to the cathodic protection rectifier, for producing at said output elements voltage having a cyclical time duration proportional to the excess in resistance of local sea water over that of the reference resistance;

whereby increased currents are made available for cathodic protection when the local sea water resistance increases.

6. Apparatus according to claim 5 wherein said bi-directional gating means comprises an SCR having its gate input coupled to said comparison means, and first and second pairs of diodes, each pair of diodes being connected in series with said SCR for providing alternate current paths therethru when said SCR is driven to conduction by sufficient voltage from said comparison means.

7. Apparatus according to claim 6 but further characterized by resistance means connected between said output element and said source of alternating current for preventing back-biasing of said SCR under essentially no load conditions.

8. Apparatus according to claim 7 wherein said comparison means comprises a first current rectifying path having reference resistance means and an output winding, and a second current rectifying path having a salinity sensing device for detecting the resistance of local sea water, and an output winding therefor wound in a sense opposite to the output winding for said first path;

said input elements for the bi-directional gating means comprising input windings coupled to said output windings and connected to the gate input of said SCR.

References Cited

UNITED STATES PATENTS

| | | | |
|---|---|---|---|
| 2,221,997 | 11/1940 | Polin | 204—196 |
| 2,998,371 | 8/1961 | Sabins | 204—196 |
| 3,031,855 | 5/1962 | Martz et al. | 307—88.5 |
| 3,067,123 | 12/1962 | Huber | 204—231 |
| 3,129,380 | 4/1964 | Lichowsky | 307—88.5 |
| 3,242,064 | 3/1966 | Byrne | 204—196 |

HOWARD S. WILLIAMS, *Primary Examiner.*

JOHN H. MACK, *Examiner.*

T. TUNG, *Assistant Examiner.*